(12) United States Patent
Ramanathan et al.

(10) Patent No.: US 7,398,292 B2
(45) Date of Patent: Jul. 8, 2008

(54) SYSTEM AND METHOD OF ENHANCING WEB SERVER THROUGHPUT IN SINGLE AND MULTIPLE PROCESSOR SYSTEMS

(75) Inventors: Venkataraman Ramanathan, Redmond, WA (US); Nk Srinivas, Issaquah, WA (US); Vadim Eydelman, Redmond, WA (US); Abolade Gbadegesin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 814 days.

(21) Appl. No.: 11/005,995

(22) Filed: Dec. 7, 2004

(65) Prior Publication Data
US 2005/0097167 A1    May 5, 2005

Related U.S. Application Data

(63) Continuation of application No. 09/606,970, filed on Jun. 28, 2000, now Pat. No. 6,910,063.

(51) Int. Cl.
*G06F 15/16* (2006.01)
(52) U.S. Cl. ............... 709/203; 709/217; 709/222; 709/228
(58) Field of Classification Search ........... 709/203, 709/217, 222, 228, 229, 227, 230
See application file for complete search history.

(56) References Cited

U.S. PATENT DOCUMENTS

| | | | |
|---|---|---|---|
| 5,519,699 A | 5/1996 | Ohsawa | |
| 5,572,678 A | 11/1996 | Homma et al. | |
| 5,727,002 A | 3/1998 | Miller et al. | |
| 5,845,280 A | 12/1998 | Treadwell et al. | |
| 6,105,064 A | 8/2000 | Davis et al. | |
| 6,215,769 B1 | 4/2001 | Ghani et al. | |
| 6,273,622 B1 | 8/2001 | Ben-David | |
| 6,310,892 B1 | 10/2001 | Olkin | |
| 6,320,874 B1 | 11/2001 | Crump et al. | |
| 6,389,462 B1 | 5/2002 | Cohen et al. | |

(Continued)

OTHER PUBLICATIONS

Joe Touch et al., Analysis of HTTP Performance, at http://www.isi.edu/lsam/publications/http-perf/index.hmtl (last visited May 17, 2000) 13 p.

(Continued)

*Primary Examiner*—Ario Etienne
*Assistant Examiner*—Sahera Halim
(74) *Attorney, Agent, or Firm*—Wolf, Greenfield & Sacks, P.C.

(57) ABSTRACT

A system and method are presented that enhance the performance of single and multiple-processor servers by taking advantage of the half-duplex nature of many HTTP requests. Upon receipt of an HTTP Get resource request, a single send and disconnect IRP is generated. The semantics of the send and disconnect IRP completion recognizes the half-duplex nature of the transaction by indicating a graceful close of the TCP/IP connection. This send and disconnect IRP is also completed without a queuing stage (queuelessly) on the processor that serviced the client request. To further enhance performance, the server FIN message to the client is included in the last data frame transmitted to the server. The invention also contemplates transmission of a single HTTP get and disconnect request by a client to allow acknowledgementless disconnection of the TCP/IP connection once a requested resource has been sent.

2 Claims, 6 Drawing Sheets

U.S. PATENT DOCUMENTS 6,457,054 B1 9/2002 Bakshi
6,460,080 B1 10/2002 Shah et al.

OTHER PUBLICATIONS

HTTP Made Really Easy, A Practical Guide to Writing Clients and Servers at http://www.jmarshall.com/easy/http/ (last visited May 17, 2000) 15 p.

Hypertext Transfer Protocol—HTTP/1.0 at http://www.faqs.org/rfcs/frc1945.html (last visited May 17, 2000) 44 p.

Hypertext Transfer Protocol—HTTP/1.1 at http://www.faqs.org/rfcs/frc2616.html (last visited May 9, 2000) 128 p.

Jason Levitt, Measuring Web-Server Capacity, Information Week at http://www.spec.org/osg/web96/infoweek/ (last visited May 16, 2000) 4 p.

Fourth Quarter '99 SPECweb96 Results at http://www.spec.org/osg/web96/results/res99q4/ (last visited May 16, 2000).

SYSTEM AND METHOD OF ENHANCING WEB SERVER THROUGHPUT IN SINGLE AND MULTIPLE PROCESSOR SYSTEMS

CROSS-REFERENCE TO RELATED PATENT APPLICATION

This patent application is a continuation of U.S. patent application Ser. No. 09/606,970, filed Jun. 28, 2000, entitled "System And Method Of Enhancing Web Server Throughput In Single And Multiple Processor Systems". The entire teachings and disclosure of this patent application are hereby incorporated in their entireties by reference thereto.

TECHNICAL FIELD

This invention relates generally to systems and methods for improving the throughput of single or multiple processor Web servers, and, more particularly, relates to systems and methods for improving throughput for static non-keep-alive hypertext transfer protocol (HTTP) transactions.

BACKGROUND OF THE INVENTION

Despite early skepticism, businesses have now fully embraced the Internet as a vehicle critical to the success of their continued operations. The explosion of e-commerce and the emergence of business to business (B2B) technologies and industry utilization, as well as the proliferation of personal computers (PCs) have galvanized the business mindset and the consuming public to the use of the Internet as an everyday tool for commerce. The explosion of such use has pushed the limits of Internet technology faster and further than heretofore thought possible.

With many corporate Web sites getting millions of hits per day, the choice of Web server software to handle these transactions can be critical. Corporate Web servers that do not respond crisply under heavy loads often slow down network connections, deny service for potential customers, and even cause network failures due to the sheer volume of business which potential customers are attempting to conduct on the Web server. Such performance slow downs and denial of service problems tend to increase customer dissatisfaction, reduce sales, and diminish the possibility for repeat customers. Additionally, denial of service and complete network failures caused by heavy volume translate directly into lost sales and lost business opportunities. Therefore, in this new economy Web server performance is critical to the long-term viability of nearly every business concern.

Lying at the core of the explosion of the popularity and usage of the Internet is the Web server and browser communication protocol known as hypertext transfer protocol (HTTP). HTTP is the network protocol used to deliver virtually all files and other data, known collectively as resources, on the worldwide Web. These resources include HTML files, image files, query results, etc. This network protocol typically takes place through TCP/IP sockets. As with other network protocols, HTTP utilizes a client-server model. In this model, an HTTP client (such as a consumer) opens a connection and sends a request message to an HTTP server (e.g. a corporate Web server). Once the HTTP server has received the request from the client, it returns a response message, typically containing the resource that was requested by the client. For most typical browsing transactions on the Internet, the server then closes the connection after delivering the response. As such, HTTP is a stateless protocol, i.e. not maintaining any connection information between transactions. While HTTP 1.1 does maintain persistent connections as a default, HTTP 1.1 also includes a "Connection: close" header that will close the connection after the corresponding response is sent.

The actual mechanism of an HTTP transaction, such as a Web browsing connection, may be better understood with reference to FIG. 4, which illustrates the basic request/response message flow between a client and a server. As may be seen from this simplified figure, a client 500 establishes a TCP connection to a server 502 by transmitting a connect request (TCP syn) to the server 502. The server 502 responds to this connect request by transmitting an acknowledgment (TCP syn+ack) to the client 500 who then completes the connect request by acknowledging (TCP ack) the server's acknowledgment of its initial request.

This three-way handshake establishes the TCP connection over which the client 500 then transmits the HTTP "Get file" request to the server. After the server 502 has received this HTTP method, it begins to transmit the resource requested to the client 500. Once the requested resource has been fully transmitted from the server 502 to the client 500, the server 502 then transmits a disconnect message (FIN) to the client 500. Once the client 500 acknowledges the disconnect message (FIN ack), the TCP connection is gracefully closed and this entire transaction is complete.

FIG. 5 illustrates in greater detail the processing that occurs within the Web server once the TCP connection has been established. Specifically, FIG. 5 illustrates the Web server processing required to transmit a file and gracefully close the TCP connection for an HTTP "Get file" request such as that illustrated in FIG. 4. As illustrated in greater detail in this FIG. 5, the server 502 comprises a user level server application 504, an auxiliary functional device 506 which is a kernel mode provider such as, for example, Winsock, and a transport layer 508. The client in this figure is merely designated by the boundary line 500, and the details of the actual transport from the server to the client have been excluded for the sake of simplicity and ease of understanding of the server mechanisms involved.

Once a TCP connection has been established to the server, and the HTTP "Get file" request has been processed, the user mode server application 504 sends a transmit file message 510 to the kernel mode provider 506. The provider 506 then generates a TdiSend request 512 for the transport layer 508 so that the requested file may be transmitted to the client 500. The transport layer 508 then begins to transmit data frames 514 to the client 500 who, in return, acknowledges 516 the receipt of the data frames.

Since the server 502 knows that it may close the TCP connection once the requested file has been transferred to the client 500, the kernel mode provider 506 also generates a TdiDisconnect request 518 to the transport layer 508. The transport layer continues to send data frames to the client 500. The typical or average amount of data that is transmitted to the client 500 is approximately 14 kbytes of information. A "large" (or Jumbo) data frame may hold up to 8 kbytes of information, and therefore typically two data frames 514a and 514b are transmitted to the client 500 at a time. Upon the final transmission of the two large data frames, the transport layer also transmits a third data frame containing a FIN to signify to the client 500 that the server is closing the TCP connection. Unfortunately, while this third data frame contains only the FIN message (and appropriate header information), its generation requires approximately the same amount of processor time in the server to generate as the data frames containing the actual requested information. Therefore, this third large data frame 520 is essentially empty, except for the FIN, and yet requires essentially the same amount of server processing to generate. This greatly increases the overhead of the server, and detrimentally impacts its performance.

In response to the transmission of the last data frames 514a, 514b, and the FIN data frame 20, the client 500 transmits the transmission ack 516 to acknowledge the receipt of the data frames, and a FIN-ack 522 to acknowledge the receipt of the FIN message 520. In response to each of these ack's 516, 522, the transport layer 508 generates an Irp-completion 524, 526 to signify the completion of both the TdiSend 512 and the TdiDisconnect 518 respectively. Additionally, in response to the receipt of the FIN-ack 522, the transport layer notifies 528 the kernel mode provider 506 of the appropriateness of a graceful disconnect (client has acknowledged closing of connection from the server's end) with the client 500. As a result, the kernel mode provider closes the TCP connection and generates a notification 530 up to the user mode server application 504 that the TCP connection has been successfully, gracefully disconnected from the client. Unfortunately, the processing of each of the Irp-completion 524, 526 incurs hundreds of processor cycles of overhead. Therefore, the processing of multiple Irp-completions also has an impact on overall server performance. That is, for each HTTP Get request, two Irp-completions must be processed, each of which requiring several hundred cycles of the server's processing capabilities.

As may now be apparent, the processing of a simple HTTP Get request from a client requires the generation of two Tdi requests to the transport layer, the transmission of an additional empty FIN data frame, the generation of two Irp-completions from the transport layer to the kernel mode provider, and the notification of the graceful disconnect from the transport layer to the kernel mode provider. These excessively complex and performance-slowing stages are all required by the current HTTP protocol, and represent significant overhead for the processing of the most commonly received HTTP requests from clients in a Web browsing environment.

This problem exists for each Web server that utilizes and processes HTTP client requests, and is compounded with every hit that the Web server receives. For larger Web servers that utilize multiple processors to enable the servicing of many more transactions per second, this problem is multiplied. The performance of these multi-processor Web servers is further detrimentally impacted by the TCP/IP requirement for the queuing of kernel mode asynchronous procedure calls (k-mode APCs) for all network input/output (IO) requests (embodied in IO request packets or IRPs). As illustrated in FIG. 6, when a thread 532 running on one processor 534 of the multi-processor server generates network IO 536, e.g. the generation of a Send IRP in response to a client HTTP get request, a kernel-mode APC in the context of this thread 532 is scheduled to write a result of the IO upon its completion. In this example, the Send IRP is completed when the server receives an Ack for the last byte of data comprising the send from the client (see FIG. 5 for an illustration of the completion of Send IRP when Ack 516 is received from the client).

As illustrated in FIG. 7, when the IO completion 538 is triggered (on the event of receipt of the acknowledgement for the last byte of data comprising the send IO's data from the client), the completion is queued to SendCompleteQ, a global Slist, along with other completions of all other IO's that were generated by threads presently running/ready to run on other processors in the system. A processor 542 periodically emties the SendCompleteQ Slist by servicing the queued completions, upon some routine event. In the following lines, the overhead of completing the Send IRP on a processor other than the initiating processor is explained. The arrow head on cache line 540b indicates movement of the cache lines containing the IRP structure from the IO-initiating processor (A, where the IRP was last modified when the IO was initiated) to the IO-completing processor (B, the one processing the SendCompleteQ) to record the result of the IO operation. The arrow head 540a indicates movement of the same cache lines containing the IRP structure, now containing the result of the IO operation, from the completion processor (the processor B on which the IO completed) to the initiating processor (the processor A) on which the result of the IO will be copied into user space through the kernel-mode APC run in the context of the user thread that issued the IO. This back and forth movement of cache lines pertaining to IRPs will happen as long as the queued completions are serviced by a processor that did not originate the IOs.

While the completion is serviced for the IRP at processor 542, e.g. the Send IRP discussed above, an inter-processor interrupt (IPI) 544 is generated to queue the APC to be run in the context of the thread 532 ready/running in the originating processor 534. For example, in an eight processor Web server, this mode of completion could generate IPIs for nearly $7/8^{th}$ of the IRPs. Unfortunately, these IPIs are very expensive in terms of system resources, requiring several thousand cycles to process, resulting from a slow APIC bus (typically 30 times slower than the processor speed, i.e., 1 APIC bus cycle completes after processor waits 30 processor cycles). As part of this overhead, the target processor is required to context switch from the currently running thread and wake up the thread for which the completion is scheduled, if not running, sometimes requiring to flush address translation entries, which is a huge overhead. As a side effect, with IPIs being generated for completing most of the Send IRPs, the APIC bus becomes swamped with traffic, further degrading performance for the overall system. Furthermore, the effect of cache line movement (540b, 540a) is very intensive on the system bus, further impacting performance.

SUMMARY OF THE INVENTION

The methods of the instant invention increase the performance throughput of single and multiple processor network servers that service HTTP transactions. Within each individual server, a method is presented to enhance its performance during the processing of static non-keep alive HTTP transactions. This performance enhancement is achieved by bundling TDI_Send, TDI_Disconnect into a single IRP, and by bundling notification with the completion of this single IRP. Further performance is achieved in multiple processor servers by removing the queuing stage of the completion processing to complete the IRPs. As a result, these IRPs are completed directly, saving IPIs that otherwise would be generated as the TCP generated queue of these completions is drained.

As discussed above, the situation enabling the enhancements within each server relates to the processing of static non-keep alive HTTP transactions resulting from a client request arriving at a web server. The server responds to the client by sending the data requested, typically utilizing TransmitFile to send the data back to the client. Since no additional traffic is expected between the server and the client (hence the term non-keep alive HTTP transaction), the server then closes the socket for reuse by another connect request. However, this most often requested process currently requires two IRPs and three events and results in the generation and transmission of an extra data frame for its completion. The method of the invention reduces the internal processing of the server by generating only a single IRP and event, and by facilitating inclusion of FIN within the last data frame, thus reducing the generation and transmission of data frames by one for each such transaction.

As discussed above with regard to multiple processor servers, when a thread running on one processor generates network IO, a k-mode APC in the context of this thread is scheduled to write a result of the IO upon its completion. If the expected IO completion is serviced by another processor (due to queuing of the completions), an inter-processor interrupt is generated to queue this APC to the thread running on the originating processor. Since each HTTP get request from the client results in the queuing of an Send IRP, IPIs are generated while completing most of the Send IRPs. In accordance with the methods of the invention, the TCP/IP completion path is modified to ensure completion of the bundled Send and Disconnect IRP on the processor that initiated the IO without a queuing stage.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
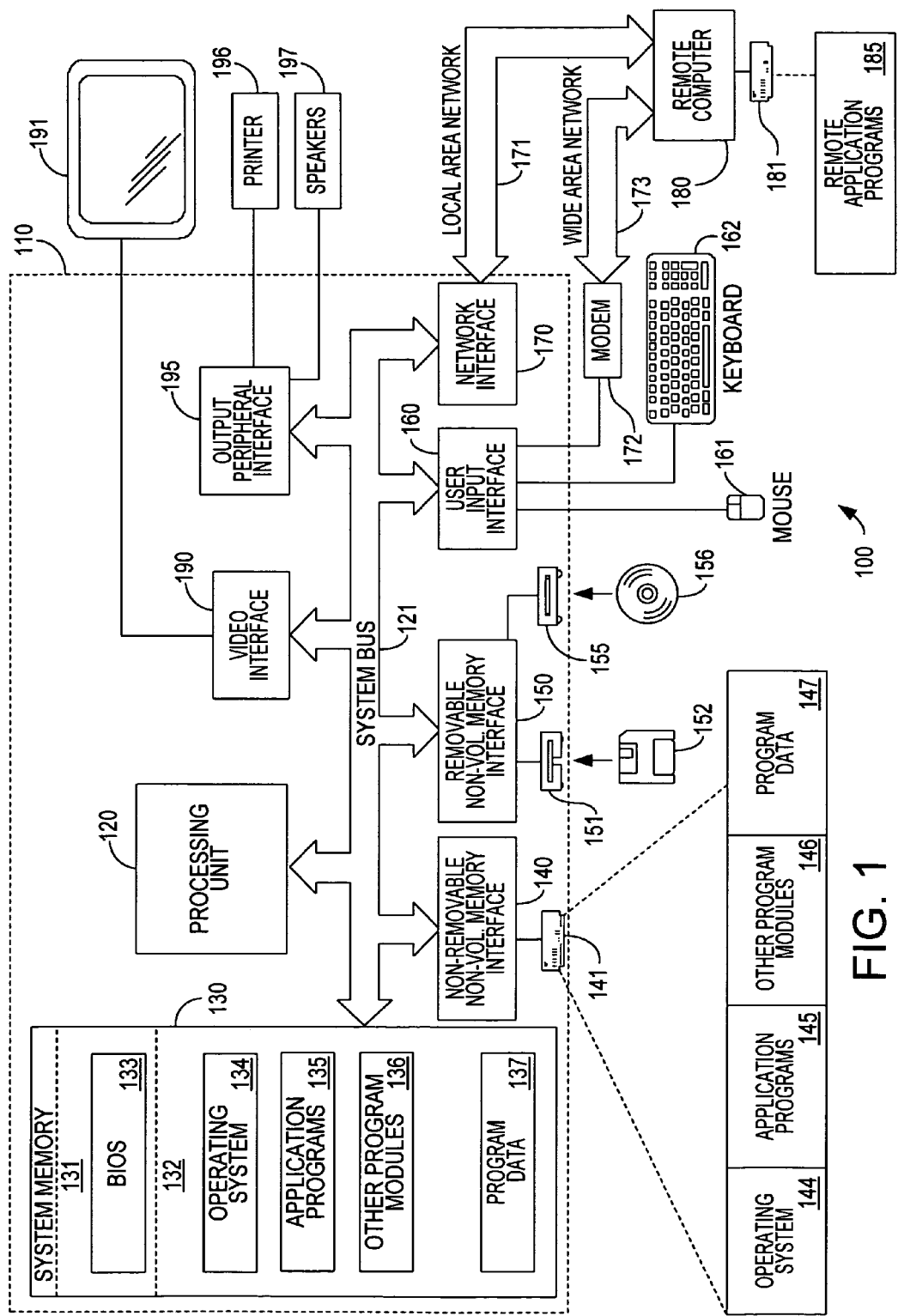
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In the context of a networked environment, such as that provided via the Internet, wherein transactions are typically characterized as client/server transactions, the systems and methods of the invention are particularly well suited for application on the server side. However, since a server of one transaction may be the client of another, the use of the term server should be taken as a functional designation in a particular transaction. Therefore, as will be recognized by one skilled in the art, the systems and methods of the invention may be embodied in both traditional client machines as well as traditional server machines. Indeed, the systems and methods of the invention may be practiced in a variety of environments that require or desire the performance enhancements provided by these systems and methods.

A measure of this throughput performance of a Web server known as SPECweb96 has been developed by the Standard Performance Evaluation Corporation (SPEC), and provides a way for administrators of large sites or others seeking to differentiate among the wide variety of Web server packages available on the market. SPECweb96 establishes a benchmark that can, in many cases, help determine which Web server software performs best on a particular set of hardware systems and network conditions. This software can evaluate the performance of Web server software running on virtually any Unix system or Windows NT platform. Like SPEC's other benchmarks, SPECweb96 is a standardized performance benchmark accepted by all interested parties as a fair test of Web server performance.

A SPECweb96 test bed consists of a server machine that runs the Web server software to be tested and a set number of client machines. The client machines use the SPECweb96 software to generate a workload that stresses the server software. The workload is gradually increased until the server software is saturated with hits and the response time degrades significantly. The point at which the server is saturated is the maximum number of HTTP operations per second that the Web server software can sustain. That maximum number of HTTP operations per second is the SPECweb96 performance metric that is reported. The following description will provide the performance improvements made possible by the systems and methods of the present invention for one embodiment thereof. However, these results are presented by way of example of one embodiment of the invention and not by way of limitation.

Figure 2:
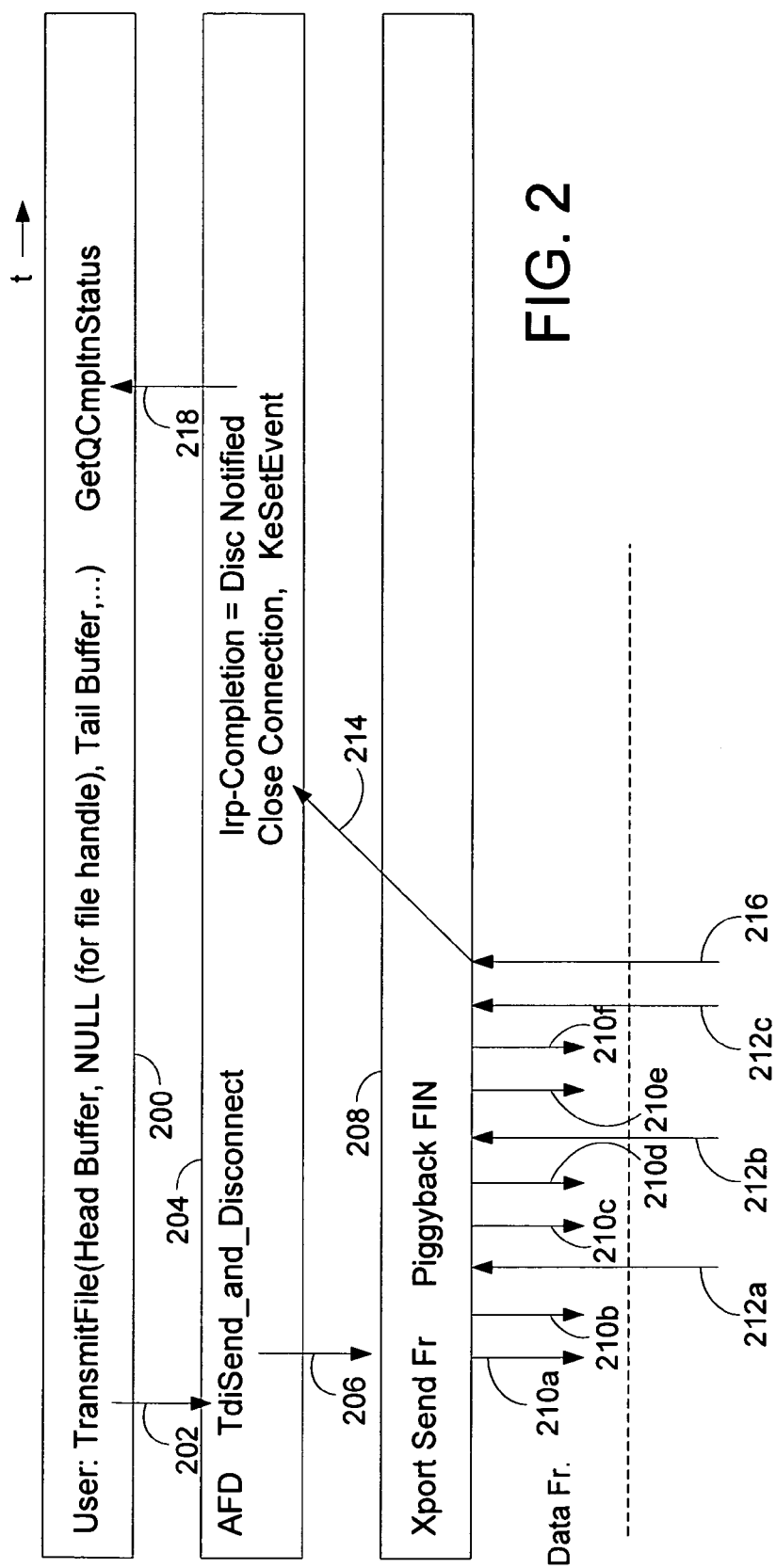
FIG. 2 is a simplified Web server transaction processing diagram illustrating Web server processing of an HTTP Get File request in accordance with a method of the present invention.
Figure 5:
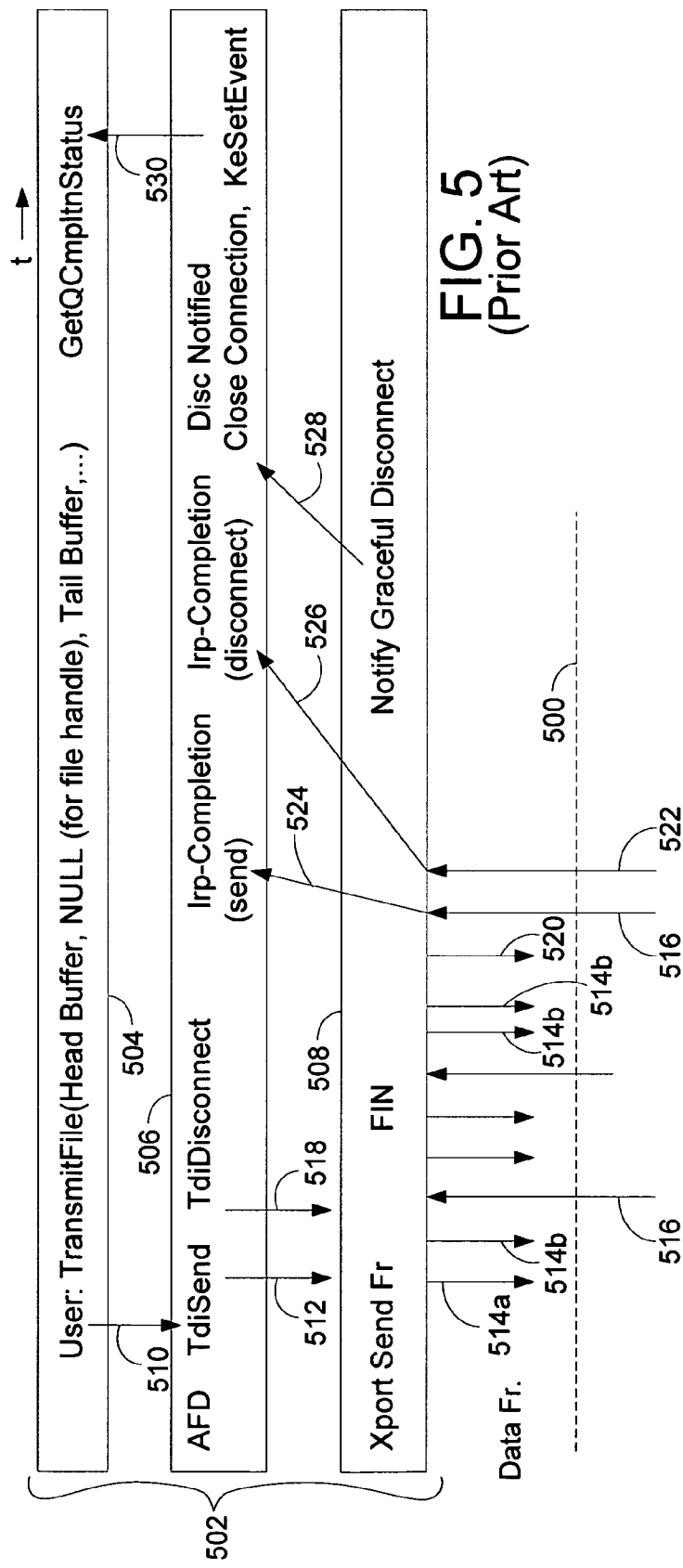
FIG. 5 is a simplified Web server transaction processing diagram illustrating typical Web server processing of an HTTP Get File request in accordance with industry standards.
Figure 6:
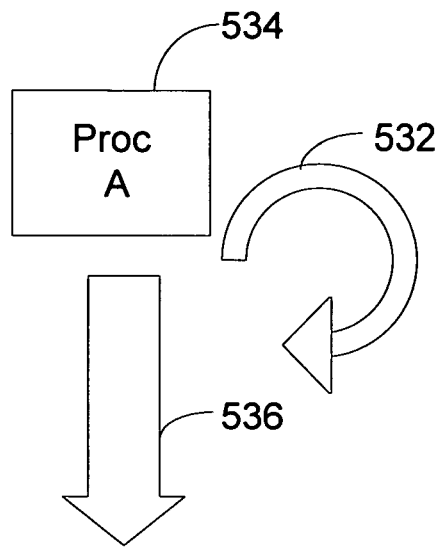
FIG. 6 is a simplified block message flow diagram illustrating the thread processing and IRP generation of a processor in a Web server.

As discussed above, a typical and one of the most voluminous transactions handled by a Web server is an HTTP Get file request from a client browsing the Web. Unlike the typical Web server whose kernel mode provider must generate two separate IRPs, a TdiSend and a TdiDisconnect (see FIG. 5), to the transport layer to process this common request, the system of the present invention generates only one IRP as illustrated in FIG. 2. As will be discussed more fully below, this represents a significant reduction in the required processing of these common requests and marks a significant improvement in the Web server's throughput capability.

Figure 4:
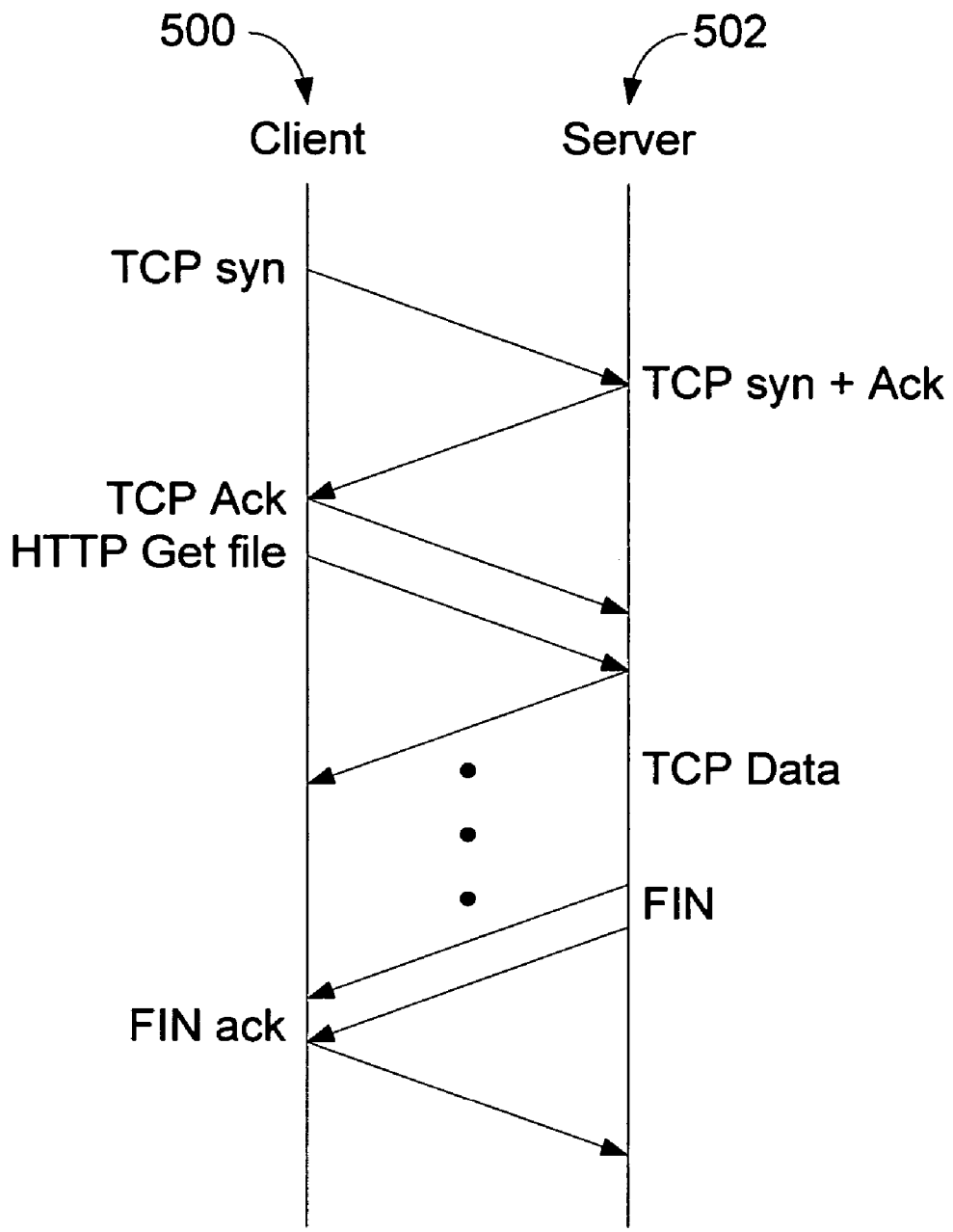
FIG. 4 is simplified message flow diagram illustrating the typical establishment of a TCP connection from a client to a server and the subsequent HTTP resource transfer from the server to the client and TCP connection closure therebetween.

Specifically, once the TCP connection has been established and the HTTP Get request from a client has been received (see FIG. 4), the server application 200 issues a TransmitFile command 202 to the auxiliary functional device (AFD) 204. As will be recognized by one skilled in the art, the AFD 204 is a kernel mode provider such as, for example, winsock. Within the AFD 204, the system of the instant invention recognizes that the requested transaction is to be terminated after the transmission of the requested HTTP resource, i.e. the AFD 204 recognizes the half-duplex nature of this HTTP transaction. As such, the AFD 204 transmits a single TdiSend_and_Disconnect IRP 206 to the transport layer (Xport) 208.

Upon receipt of the TdiSend_and_Disconnect IRP 206, the transport layer 208 begins to transmit data frames 210a-f of the requested resource to the client. The transport layer also looks for the acknowledgments 212a-c of these data frame transmissions from the client. While the illustration of FIG. 2 illustrates multiple transmissions of data frames 210a-f, one skilled in the art will recognize that such multiple transmissions may not be necessary for smaller requested HTTP resources. Indeed, typical Web browsing transactions may only require that one or two large data frames, e.g. 210e and 210f, be transmitted to the client to satisfy the HTTP Get request as discussed above. It is in precisely these most often encountered transactions that the system of the present invention provides its largest percentage reduction in server loading.

This improvement is a result of the piggybacking of the FIN with the last data frame 210e of the requested resource. Instead of transmitting a data frame containing the requested resource and then transmitting an additional empty data frame to communicate the FIN as required by prior systems (see FIG. 5), the system of the instant invention eliminates the necessity of this extra data frame entirely. Since this extra data frame requires approximately the same amount of processor time to generate as the data frames containing the actual requested information, its elimination through the system of the instant invention greatly reduces the server's overhead and improves its capability to service multiple client requests.

A further enhancement in server performance is gained by the system of the invention by changing the semantics of the new send and disconnect IRP to reflect the half-duplex nature of this transaction more closely. Specifically, the completion of the send and disconnect IRP 214 generated by the transport layer 208 upon receipt of a FIN-Ack 216, signifies to the AFD 204 the initiation of a graceful close of the TCP connection. This single event 218 is then communicated to the server application 202. This represents a significant improvement of prior systems (see, e.g., FIG. 5) that required the generation of a separate notification (528 in FIG. 5) from the transport layer to indicate the graceful disconnect. As discussed above, this notification requires several hundred cycles to process fully. This additional processor overhead is completely eliminated with the system of the instant invention.

Through the system of the instant invention, a performance gain of between 25% to 30% of processing cycles is expected from the combined TdiSend_and_Disconnect IRP for a typical TransmitFile operation. As a result of the gained cycles made possible by the system of the invention, an approximate 20% improvement for SPECweb96 performance is obtained. These gained cycles are a result of the IRP allocation, spin-lock spins (the acquiring and releasing during completion and dispatch of Disconnect IRP and during Disconnect Notification (AFD, TCP/IP)), interlocked operations for reference counting on AFD connection data structures, and from the guaranteed FIN piggyback in the last data frame from TCP. As discussed above, the piggybacking of the FIN in the last data frame saves a zero-byte send and send-completion that occurs due to timing of the disconnect IRP in the prior system.

It should be noted that the bundled TDI send and disconnect may be canceled. Following such cancellation the TCP connection is left in FIN-WAIT1 state, i.e. no other sends must progress on this connection. This TCP connection then behaves as an incoming-only half-duplex connection in which receives can be accomplished (slowly due to the TCP_FLAG_SLOW being set due to the state change). The Send IRP is canceled as a normal send if the FIN was not sent, otherwise it is completed. In this state the disconnect must then be accomplished by a separate IRP. In an alternate embodiment the TCP connection may be returned to the ESTAB state, which is the desired behavior in the case where the FIN has not been sent.

The server is not the only party to this type of transaction who knows that the connection should be terminated once the request has been satisfied. Indeed, the client also knows that the TCP connection to the server need not be maintained once the client has received its requested resource. Therefore, in an alternate embodiment of the present invention, the client may bundle the HTTP Get request with a Disconnect request. The server is then able to send the requested resource with a send and disconnect IRP, indicating to the stack of impending send and disconnection of the connection through the same IRP, while saving overhead of receive path for a special FIN frame.

Once this resource has been sent, the server may close the TCP connection without further notification (through FIN frame) from the client (acknowledgelessly closing the connection). This further enhances server performance since the server may close the TCP connection without having to wait for any disconnect frame from the client.

Figure 3:
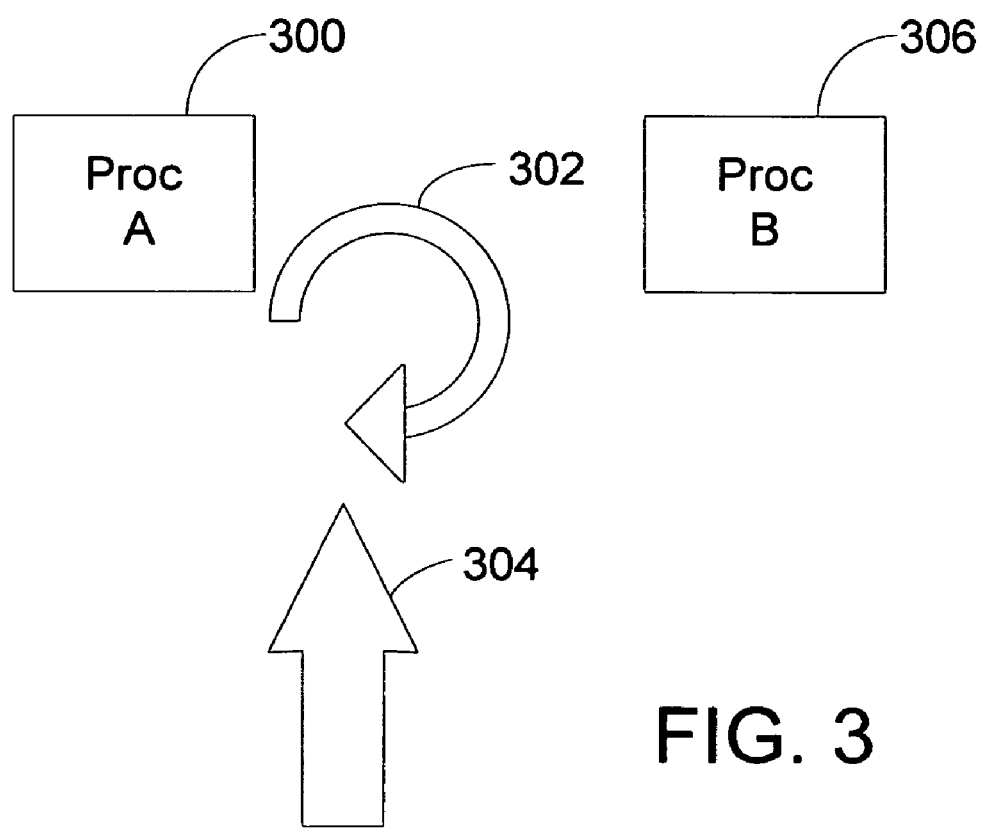
FIG. 3 is a simplified TCP/IP completion path diagram for a multiple processor Web server illustrating IRP completion processing in accordance with a method of the present invention.
Figure 7:
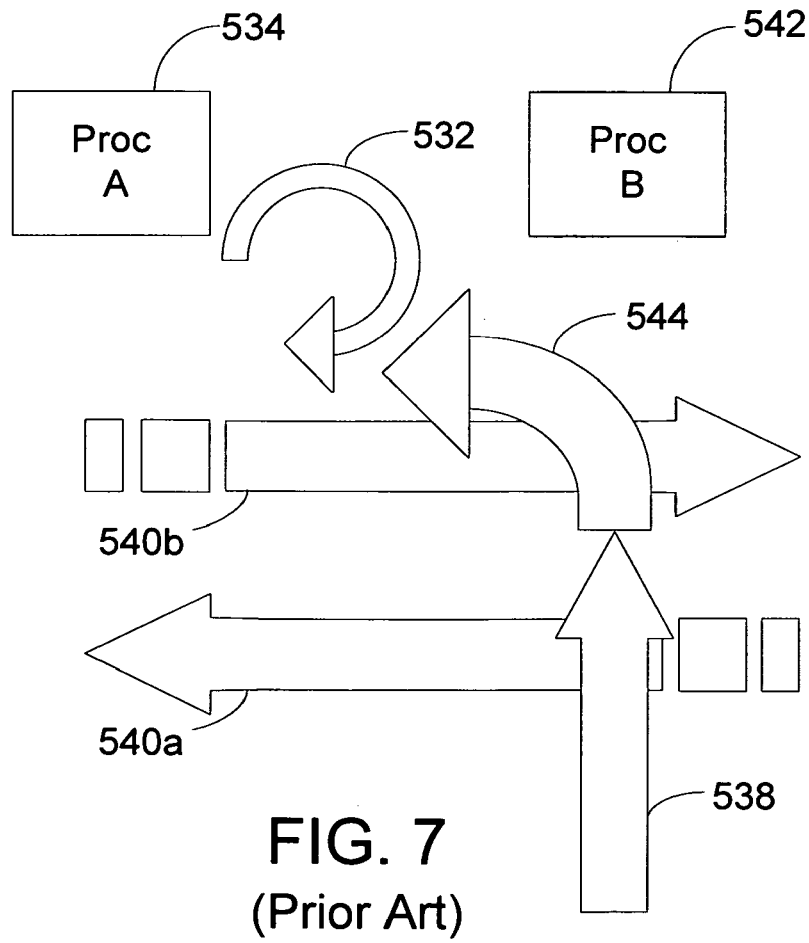
FIG. 7 is a simplified TCP/IP completion path diagram for a multiple processor Web server illustrating IRP completion processing in accordance with typical industry standard processing.

The performance enhancements made available through the system of the invention described above all presuppose completion of the IRP on the processor that originated it. While this is a foregone conclusion for single processor servers, conventional multiple-processor servers require a queuing state and an IPI to ensure that all IRPs are so completed as discussed above with reference to FIG. 7. However, this queuing state and subsequent IPI generation creates extra overhead for the server and adversely impacts its performance. Therefore, in multiple-processor servers employing the system of the instant invention, all IRPs are directly completed on the originating processor without a queuing state as illustrated in FIG. 3. As is illustrated, the processor 300 running thread 302 directly receives the IRP completion 304 without a queuing state as required by conventional systems. Other processors 306 in the server are not required to service this IRP completion 304, and therefore need generate no IPIs. The system of the invention also minimizes the cache line movement incurred in conventional systems, which further enhances performance.

A direct completion path is included in the system of the present invention for the bundled Send and Disconnect IRPs discussed above (see FIG. 2). Similar to the direct completion of the conventional Send IRPs and disconnect IRPs, the bundled Send and Disconnect IRPs are directly completed through the SendComplete path. This path occurs if the connection is gracefully closed sooner than NDIS's (Network Driver Interface Specification) SendComplete call for the last data frame. With current high throughputs of modern servers, this is a definite possibility especially in files that can fit into one jumbo data frame.

For throughputs around 12,000, on a 4 processor configuration, with direct completion of the bundled Send and Disconnect IRPs, the system of the present invention reduced the number of IPI calls from 8,000 per processor to 2,000 system-wide. This reduction equates to an approximate 3-4% improvement in throughput with SPECWeb96 running a User Mode Web content caching multi-threaded application know as Scalable Web Cache (SWC). With an eight processor, 500 MHz server, it is estimated that the further reduction of IPIs due to direct completion of the Send and Disconnect IRPs in the SendComplete path will totally remove the need for IPIs. This should provide an additional 10-15% improvement in server performance for SPECWeb96.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method of transmitting an HTTP resource from a server to a client via a TCP connection in response to a request from a client, wherein the server is a multiple-processor server, comprising the steps of:

generating a transmit resource request in an user mode server application;

passing the transmit resource request to a kernel mode provider;

generating a bundled send and disconnect IRP;

passing the bundled send and disconnect IRP to a transport layer;

transmitting at least one data frame containing the requested resource;

generating an Accept IRP on a first one of the multiple processors in response to receipt of a SYN TCP/IP connection request;

transmitting a SYN Ack to the client;

queuelessly transmitting a TCP Ack to the first one of the multiple processors upon receipt from the client; and generating an Accept IRP completion within the first one of the multiple processors to establish the TCP/IP connection to the client.

2. A method of enhancing Web server performance, the Web server servicing HTTP client requests for resources via a TCP/IP connection, wherein the Web server includes multiple processors, comprising the steps of:

generating a single TdiSend_and_Disconnect IRP;

preparing at least one data frame to transmit the requested resource to the client;

packaging a FIN in said at least one data frame;

transmitting the at least one data frame containing the FIN to the client;

closing the TCP/IP connection upon receipt of a FIN-Ack from the client;

generating an Accept IRP on a first one of the multiple processors in response to receipt of a SYN TCP/IP connection request;

transmitting a SYN Ack to the client;

queuelessly transmitting a TCP Ack to the first one of the multiple processors upon receipt at the server from the client; and generating an Accept IRP completion within the first one of the multiple processors to establish the TCP/IP connection to the client.

* * * * *